United States Patent [19]
Stephens, Jr. et al.

[11] Patent Number: 5,137,566
[45] Date of Patent: Aug. 11, 1992

[54] PROCESS FOR PREHEATING IRON-CONTAINING REACTOR FEED PRIOR TO BEING TREATED IN A FLUIDIZED BED REACTOR

[75] Inventors: Frank M. Stephens, Jr., Lakewood; John P. Hager, Golden; Frank A. Stephens, Arvada, all of Colo.

[73] Assignee: Iron Carbide Holdings, Limited, Lakewood, Colo.

[21] Appl. No.: 561,189

[22] Filed: Aug. 1, 1990

[51] Int. Cl.⁵ .................. C22B 5/14; C01B 31/30
[52] U.S. Cl. ......................... 75/507; 75/446; 423/439
[58] Field of Search .......... 75/444, 446, 507; 423/439

[56] References Cited

U.S. PATENT DOCUMENTS

| Re. 32,247 | 9/1986 | Stephens, Jr. . | |
| 2,535,042 | 12/1950 | Cohn et al. | 423/439 |
| 2,752,234 | 6/1956 | Shipley . | |
| 2,780,537 | 2/1957 | Stelling et al. | 423/439 |
| 2,864,688 | 12/1958 | Reed . | |
| 2,894,831 | 7/1959 | Old et al. . | |
| 2,921,848 | 1/1960 | Agarwal . | |
| 3,021,208 | 2/1962 | Feinman . | |
| 3,356,488 | 12/1967 | Walsh . | |
| 3,761,244 | 9/1973 | Hoffert | 75/444 |
| 3,885,023 | 5/1975 | Gray et al. | 423/439 |
| 3,928,021 | 12/1975 | Matsubara et al. . | |
| 4,045,214 | 8/1977 | Wetzel et al. . | |
| 4,202,534 | 5/1980 | Davis, Jr. | 266/172 |
| 4,360,378 | 11/1982 | Lindstrom . | |
| 4,851,040 | 7/1989 | Hoster et al. . | |

Primary Examiner—Melvyn J. Andrews
Attorney, Agent, or Firm—Sheridan, Ross & McIntosh

[57] ABSTRACT

A novel process for the conversion of reactor feed to iron carbide is provided. The process includes the step of preheating the reactor feed in an oxidizing atmosphere. The iron carbide produced by the process is particularly useful in the production of steel.

25 Claims, 4 Drawing Sheets

FIG. 1
Fe-O-H-C STABILITY DIAGRAM AT 800K (980°F)(527°C)

FIG. 7
CONVERSION OF ROD MILL PRODUCT, UNOXIDIZED

FIG. 8
CONVERSION OF ROD MILL PRODUCT, OXIDIZED

PROCESS FOR PREHEATING IRON-CONTAINING REACTOR FEED PRIOR TO BEING TREATED IN A FLUIDIZED BED REACTOR

FIELD OF THE INVENTION

The present invention relates to the processing of reactor feed materials such as iron ore, iron ore concentrates and the like, into non-oxide iron compounds. More particularly, the present invention relates to improved methods for the conversion of iron oxide-containing feeds into iron carbide, which is particularly useful in a direct, iron carbide steel-making process.

BACKGROUND OF THE INVENTION

Typically, iron ore is converted to steel through basic processes that have been known for many years. These processes usually involve the conversion of iron ore to pig iron in a blast furnace using coke produced in a coke oven, and the subsequent conversion of the pig iron, or hot metal, to steel in an open hearth or basic oxygen furnace. However, the high energy and capital costs involved with making steel in the traditional manner have created a demand for new, less expensive methods for producing steel. More specifically, a great deal of effort has been directed to the elimination of the blast furnace and coke oven in steel-making. Blast furnaces use large quantities of energy, the cost and availability of which is becoming more and more uncertain. Additionally, coke ovens are a large source of pollutants, and modifications to existing coke ovens to meet government regulations are becoming prohibitively expensive.

Accordingly, some effort has been directed to the conversion of iron ore directly to iron carbide followed by the production of steel from the iron carbide, thereby eliminating the blast furnace step.

In this regard, U.S. Reissue Pat. No. Re 32,247 by Stephens, Jr. discloses a process for the direct production of steel. Iron oxides in iron ore are converted to iron carbide, and steel is then produced directly from the iron carbide in a basic oxygen furnace or electric furnace. The electric furnace is typically an electric arc furnace, although it is possible to use other electric furnaces, such as an induction furnace. In the direct production process, the iron oxides in the iron ore are reduced and carburized in a single operation using a mixture of hydrogen (as a reducing agent) and carbon bearing substances (as carburizing agents). The process is typically carried out in a fluidized bed reactor. Steel is then produced by introducing the iron carbide into a basic oxygen furnace or electric furnace, with the blast furnace step being eliminated.

While the process of Stephens, Jr. has proven to be an important advance in the art, a need exists for further improvements in this method of directly producing steel. For example, in the step of converting the iron oxides into iron carbide, even minor variations in the process parameters can cause inferior results, e.g., minor variations in the interrelated process parameters of temperature, pressure and gas composition can cause free iron (Fe) or a variety of iron oxides such as $Fe_2O_3$, $Fe_3O_4$, and $FeO$ to be produced, rather than iron carbide.

The usefulness of preheating iron ores prior to being placed in a fluidized reactor bed is described in the prior art. However, none of these prior art references disclose the preheating of iron oxides in conjunction with a process of the type disclosed by Stephens, Jr.

U.S. Pat. No. 2,752,234 by Shipley discloses a process for the direct reduction of iron ore to iron. The raw iron ore is preferably preheated to a temperature of about 700° F. (370° C.) by off-gases from the reaction comprising hydrogen and carbon monoxide.

U.S. Pat. No. 2,864,688 by Reed discloses a method of forming iron including the step of preheating iron oxide-containing raw material that is a mixture of hematite and magnetite, to a temperature of about 1700° F. (930° C.).

Other patents that disclose the preheating of iron ore prior to being placed in a reactor bed include U.S. Pat. No. 2,894,831 by Old et al., U.S. Pat. No. 2,921,848 by Agarwal, U.S. Pat. No. 3,021,208 by Feinman, U.S. Pat. No. 3,761,244 by Hoffert, U.S. Pat. No. 3,928,021 by Matsubora et al., U.S. Pat. No. 4,045,214 by Wetzel et al., U.S. Pat. No. 4,360,378 by Lindstrom, U.S. Pat. No. 4,202,534 by Davis Jr. and U.S. Pat. No. 4,851,040 by Hoster et al.

However, none of the prior art references describe a process for preheating iron oxide ore that would be beneficial to an iron carbide production process. The chemistry and equilibrium conditions for forming iron carbide are significantly different than the conditions necessary for forming metallic iron.

SUMMARY OF THE INVENTION

In accordance with the present invention, a process is provided for the conversion of iron ore to iron carbide including the step of preheating the reactor feed in an oxidizing atmosphere. In one embodiment, the reactor feed is preheated to a temperature of between about 500° C. and 900° C. In another embodiment, the reactor feed comprises at least about 30, preferably greater than about 50 and more preferably greater than about 80 weight percent hematite after preheating.

In accordance with another embodiment of the present invention, a process is provided for the conversion of reactor feed to iron carbide, wherein the reactor feed is preheated prior to conversion to iron carbide in order to volatilize or stabilize sulfide sulfur.

In accordance with another embodiment of the present invention, a process is provided for the conversion of reactor feed to iron carbide wherein the reactor feed is preheated prior to conversion to iron carbide in order to remove water from the reactor feed.

In accordance with another embodiment of the present invention, a process is provided for the conversion of reactor feed to iron carbide, including the steps of preheating a reactor feed prior to contacting the reactor feed with reducing and carburizing gases to convert at least 90 percent of the iron to iron carbide.

In accordance with another embodiment of the present invention, a process is provided for the reduction of reactor feed containing magnetite to iron carbide, including the step of preheating the feed in an oxidizing atmosphere to a temperature of at least about 500° C. to convert at least a portion of the magnetite to hematite.

In accordance with another embodiment of the present invention a process is provided for the production of steel from iron carbide, including the step of preheating the reactor feed prior to converting the feed to iron carbide.

The present invention advantageously provides a process wherein a reactor feed is preheated to supply a portion of the required heat to the fluidized bed reactor while simultaneously placing the reactor feed in a form suitable for conversion to iron carbide. The process of the present invention can reduce the levels of harmful sulfide sulfur in the reactor feed. Advantageously, the amount of water in the reactor feed can be reduced. It has been discovered that conversion of magnetite to hematite during a preheating step can provide benefits during the conversion to iron carbide.

DETAILED DESCRIPTION OF THE PREFERRED EMBODIMENTS

A process for the conversion of iron oxide ore to iron carbide and the subsequent use of that iron carbide in a direct steel-making process is disclosed in U.S. Reissue Pat. No. Re 32,247, which is incorporated herein by reference in its entirety. This process involves the conversion of iron oxide ore fines or concentrates to iron carbide using fluidized bed units operating at relatively low temperatures and employing mixed hydrogen, carbon monoxide and other hydrocarbon gases (e.g. methane and/or propane) as reducing and carburizing agents.

The iron carbide is non-pyrophoric, can be transported easily, and contains a high percentage of iron. The required reducing gases can be produced utilizing conventional gas producing systems from natural gas, liquid fuels or solid fuels, none of the systems being dependent on high-quality fuels.

The iron carbide product can be used directly in a conventional or modified basic oxygen vessel where it can be batch charged or blown into the vessel utilizing, for example, a pneumatic transfer system. While iron carbide releases heat upon oxidation, it is advantageous to use hot iron carbide directly from the fluidized bed reactor as the feed to the steel-making furnace, thereby further reducing the amount of heat energy necessary to produce steel.

The fluidized bed reactor feed typically available for reduction to iron (Fe), iron carbide ($Fe_3C$) or the like, is typically a mixture of iron oxides such as magnetite ($Fe_3O_4$), hematite ($Fe_2O_3$) and other materials, rather than consisting entirely of one material. The reactor feed may also include some gangue and water. As used herein, the term reactor feed refers to any iron-containing material useful in the practice of the present invention, for example, iron ores and iron ore concentrates.

According to the present invention, the conversion of reactor feed to iron carbide is improved by preheating the reactor feed prior to the conversion. Preferably, the preheating is carried out in a kiln with an oxidizing atmosphere.

The reactor feed is preferably preheated to a temperature of between about 300° C. and about 1000° C., more preferably between about 500° C and about 900° C., and most preferably between about 600° C. and about 800° C. The reactor feed is preferably preheated for a period of time sufficient to oxidize at least a portion of the feed and thereby improve the efficiency of the conversion to iron carbide. For example, it is preferred that at least a portion of any magnetite present in the reactor feed is converted to hematite. It is preferable to preheat the reactor feed at least until the percentage of hematite is greater than about 30 weight percent, more preferably greater than about 50 weight percent, and most preferably greater than about 80 weight percent of the total feed. The advantages of preheating the reactor feed in this manner will be explained in more detail below.

The kiln utilized for the preheating process can be any kiln which is capable of attaining the preferred temperatures and providing oxygen-containing gas to the reactor feed. As used herein, the term kiln includes any furnace or heating unit, for example, a rotary hearth furnace or a fluidized bed furnace.

Gas compositions preferably used in the kiln atmosphere during the preheating step include any gas compositions which are capable of oxidizing the reactor feed. For example, air, which typically includes about 21 percent oxygen, can be circulated through the preheat kiln to supply oxygen. Any gas or mixture of gases that contain free oxygen, e.g. pure oxygen and oxygen-enriched air, can be used. It is preferable that the oxygen-containing gas includes at least between about 1 percent and about 10 percent oxygen, more preferably between about 2 percent and about 5 percent oxygen. In a preferred embodiment of the present invention, excess air is added to a fuel to generate oxygen-rich combustion gases used to preheat and oxidize the reactor feed.

One advantage to preheating the reactor feed in an oxidizing atmosphere is that any magnetite that may be present in the feed is partially or fully oxidized to hematite, prior to being converted to iron carbide. It has been found that hematite is more readily converted to iron carbide than is magnetite. While not wishing to be bound by theory, it is believed that the improvement is attributable to the opening of interstitial pores in the iron oxide structure when additional oxygen atoms are forced into the structure during the preheat step and then removed from the structure during the conversion, leaving a more porous structure available for subsequent diffusion controlled reactions.

In addition to the oxidation of magnetite to hematite, other advantages are realized by utilizing the process of the present invention. For example, sulfur is eliminated or stabilized when preheated in an oxidizing atmosphere. In an oxidizing preheat step, sulfide sulfur content is significantly reduced by conversion to sulfur dioxide ($SO_2$), which is a volatile gas, or stabilized by being oxidized and subsequently combined with alkaline earth oxides, such as calcium oxide or potassium oxide, to form thermally stable sulfates. It has been found that the presence of sulfide sulfur in the reactor feed during the conversion step retards the production of iron carbide. Thus, preheating in an oxidizing atmosphere yields another unexpected result that is beneficial to the production of iron carbide from reactor feeds.

The preheat step also reduces free moisture, as well as moisture of hydration, thus reducing the amount of water entering the conversion reactor. In this respect, the minimization of moisture is important since the conversion is partially controlled by the amount of hydrogen which can be converted to water by combining with oxygen in the feed. Due to chemical equilibrium constraints, any increase in water coming into the reactor limits the amount of water that can be formed in the reactor. Hence, removal of the water in the preheat step improves the efficiency and capacity of the process. Preferably, the total water content in the preheated reactor feed is less than about 4 percent, more preferably less than about 3 percent, and most preferably less than about 2 percent.

Finally, by preheating the reactor feed, less heat needs to be added to the fluidized bed reactor system by the conversion gases or by heating the fluidized bed reactor.

After the reactor feed has been preheated, the feed is then converted to iron carbide, preferably in a fluidized bed reactor.

To insure that the end product is substantially iron carbide, the composition of the conversion gases, the pressure and the temperature must be tightly controlled. Preferably, this control is maintained by a computer automated system, which is the subject of commonly assigned copending U.S. Pat. application Nos. 07/561,100 and 07/561,077 identified as Attorney File Nos. 2206-7 and 2206-8, entitled "METHOD FOR CONTROLLING THE CONVERSION OF IRON-CONTAINING REACTOR FEED INTO IRON CARBIDE", and "PROCESS FOR CONTROLLING THE PRODUCT QUALITY IN THE CONVERSION OF REACTOR FEED INTO IRON CARBIDE", respectively, both filed on even date herewith, and both incorporated herein by reference in their entirety.

Typically, the equilibrium gas system comprises five gases. These include water ($H_2O$), carbon monoxide (CO), carbon dioxide ($CO_2$), hydrogen ($H_2$), and methane ($CH_4$). Additionally, there may be nitrogen ($N_2$) present in the system.

While the above constitutes the equilibrium gases, it is to be understood that hydrogen, carbon and oxygen can be added to the system in any number of forms, including gaseous or solid form, so that the five gases at any given temperature and pressure are in the preferred proportions. For example, other hydrocarbon gases, such as propane ($C_3H_8$), can be added to attain the proper equilibrium of hydrogen, carbon and oxygen.

Figure 1:
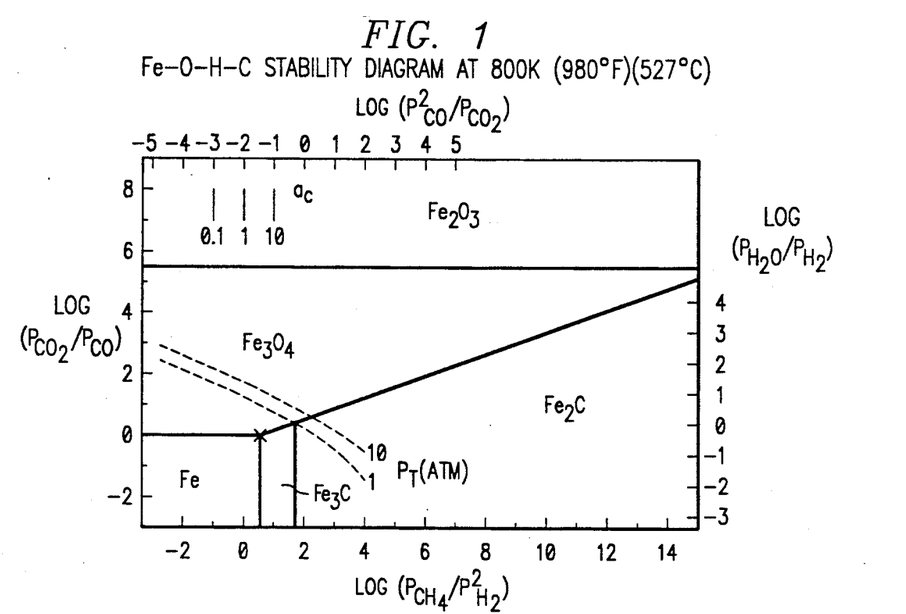
FIG. 1 is a stability diagram at 527° C. for the Fe-O-H-C system.

FIG. 1 is a stability diagram representative of the iron-oxygen-hydrogen-carbon system as it relates to the formation of iron carbide ($Fe_3C$) at about 527° C. The diagram shows that by controlling the gaseous atmosphere, it is not only possible to insure that iron carbide will be the stable end product, but that iron carbide can be produced directly from iron oxides without first producing metallic iron.

Because any point on the stability diagram at a given temperature and pressure represents a unique gas composition in this five species gas system, it is possible to translate the log coordinates into gas compositions based on the equilibrium constraints represented by the following equilibria:

$$CO + H_2O \rightarrow CO_2 + H_2$$

$$CH_4 + H_2O \rightarrow CO + 3H_2$$

Preferably, the incoming gas contains the following (or the equivalent thereof), in mole percent: up to about 20 percent, preferably between about 5 percent and about 10 percent carbon monoxide; up to about 20 percent, preferably between about 2 percent and about 8 percent, carbon dioxide; up to about 80 percent, preferably between about 35 percent and about 50 percent methane; up to about 80 percent, preferably between about 35 percent and about 50 percent hydrogen; from about 0 percent to about 15 percent, preferably between about 0 percent and about 10 percent nitrogen; and up to about 5 percent, preferably between about 1 percent and about 2 percent water vapor.

During the conversion process, the gas pressure above the fluidized bed reactor is preferably in the range of about 15 to about 45 psia (about 100 to about 310 kPa), more preferably between about 15 and about 30 psia (about 100 to about 210 kPa). The temperature in the windbox space below the fluidized bed is preferably in the range between about 500° C. and 750° C., and more preferably in the range between about 600° C. and about 700° C. The temperature in the space above the fluidized bed is preferably in the range between about 500° C. and about 650° C., and more preferably between about 550° C. and about 600° C.

Figure 2:
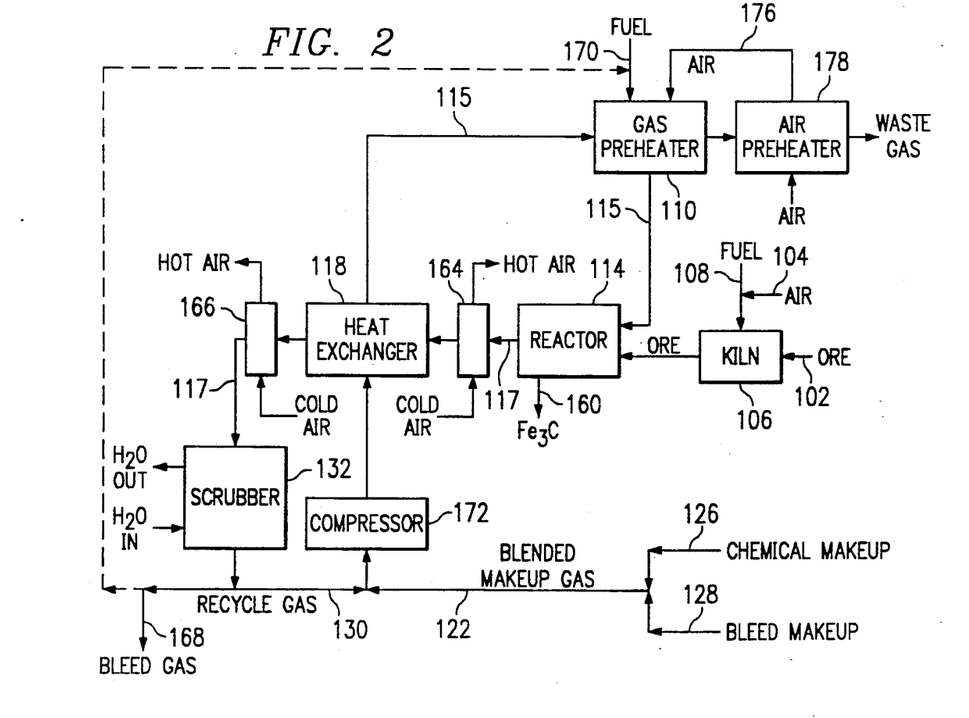
FIG. 2 is a flow sheet of one embodiment of the present invention for the conversion of a reactor feed containing iron oxide ore to iron carbide.

Referring now to FIG. 2, ore 102 is placed into preheat kiln 106 where the ore is preheated by the combustion of fuel 108 and oxidized by an excess of incoming air 104. The air 104 assists in the combustion of the fuel 108 and provides oxygen to the ore 102. The ore 102, now preheated, oxidized, dehydrated, and free of volatile contaminants, is transferred to fluidized bed reactor 114 where the ore 102 is subjected to reducing and carburizing gases 115 from gas preheater 110.

After a sufficient time in the fluidized bed reactor 114, the iron carbide 160 is removed. Since more gas 117 comes off of the fluidized bed reactor 114 than gas 115 that went in (due to the liberation of oxygen and water from the ore), the off-gas 117 has a high heat content. Therefore, two fin fan units 164 and 166 are used to cool the gas 117. A heat exchanger 118 placed between the two fin fan units 164 and 166 is employed to heat the reducing and carburizing gases 115 prior to their introduction into gas preheater 110.

The reactor off-gases 117 then move to a scrubber 132. In the scrubber 132, a venturi scrubber (not shown) is employed to remove excess heat in the reactor off-gas 117. The gas then moves to a packed tower section (not shown) of the scrubber 132 where the off-gas is run counter-current to water at about 21° C. to condense water formed in the reactor. After scrubbing, the gas is recycle gas 130. Some of the recycle gas 130 can be bled off 168 to control the build-up of nitrogen. The bleed 168 is necessary if the makeup gas 122 includes nitrogen, otherwise the gas stream would eventually consist almost entirely of nitrogen. The bleed gas can be recycled for fuel 170.

Gases 115 for the fluidized bed reactor 114 come from gas preheater 110 where they are preheated to between about 600° C. and about 800° C. To formulate the carburizing and reducing gas mixture 115, chemical make-up 126 and bleed make-up 128 gases are blended to form a blended make-up gas 122. This blended makeup gas 122 is then added to the scrubbed recycle gas 130, and the resultant gas mixture 115 is passed through a compressor 172 and heat exchanger 118. After passing through the heat exchanger 118, the gas stream 115 is transferred to the gas preheater 110. Preheated air 176 from air preheater 178 is used to assist in the combustion of fuel 170 in order to preheat the gas 115.

To efficiently convert the reactor feed to iron carbide, it is preferable that the feed material remain in contact with the conversion gases for a length of time sufficient to allow the diffusion controlled reactions to proceed to completion. In prior art single compartment, non-baffled fluidized bed reactors, rapid mixing of fresh feed material with the material in the bed takes place, with the degree of mixing being a function of the turbulence in the bed which, in turn, is a function of the gas velocities used for fluidization. This mixing of feed and product results in unreacted material being transported to the discharge port and thus produces a product containing some unreacted, and therefore undesirable, constituents.

To minimize this undesirable mixing or short circuiting, while maintaining the excellent gas-solid contact characteristics of the fluidized bed, it is preferable to create a plug flow condition for the solids in the fluidized bed reactor. A vessel of substantially uniform cross-section, for instance, any rectangular or circular cross-section, can be used as the fluidized bed reactor. However, due to heat stress and non-uniform heating problems in these linear reactors, it is preferable to use a circular fluidized bed reactor having baffles that cause the feed material to move in a predetermined manner from the initial feed point to the reactor discharge point. The fluidized bed reactor design preferably used in conjunction with the present invention is the subject of commonly-owned U.S. Patent Application Serial No. 07/561,076, entitled "FLUIDIZED BED REACTOR AND PROCESS FOR USING SAME", filed on even date herewith, and incorporated herein by reference in its entirety.

The number and arrangement of the baffles required for any given size reactor and set of conditions can be determined and the baffles adjusted accordingly. In this instance, it is desirable to know the quantity, temperature, composition, and pressure of the conversion gases, as well as the quantity, temperature, and composition of the ore, in order to determine the optimal baffle configuration. The optimal baffle configuration refers to the number of baffles required to give plug flow conditions, while insuring the substantial completion of the desired reaction.

Figure 3:
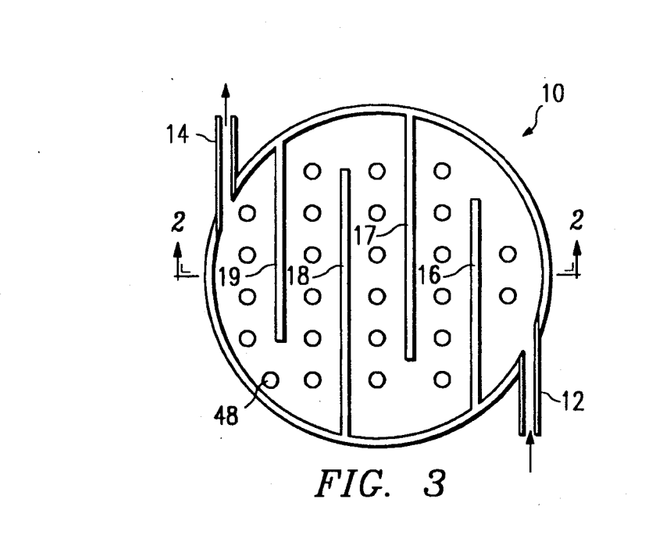
FIG. 3 is a top view of an embodiment of a fluidized bed reactor.
Figure 4:
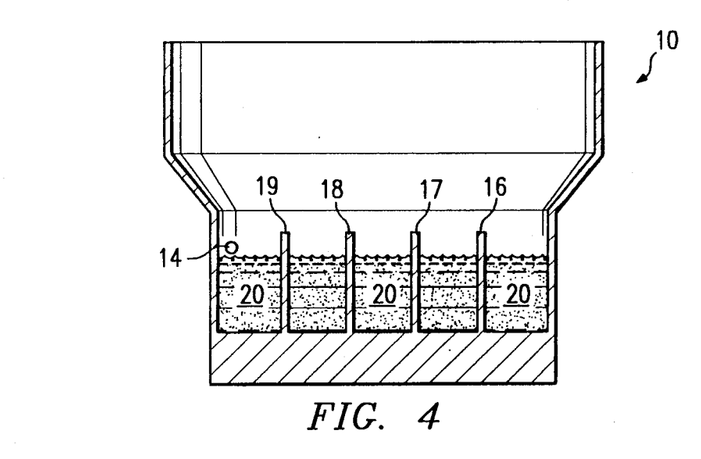
FIG. 4 is an embodiment of a fluidized bed reactor in cross-section taken long line 4—4 of FIG. 3.

Referring now to FIGS. 3 and 4, an embodiment of the fluidized bed reactor design is shown. The reactor feed enters the fluidized bed reactor 10 at inlet 12 and proceeds through the fluidized bed reactor 10 in an essentially plug flow manner. The reactor feed is fluidized by a plurality of nozzles 48. Preferably the nozzles are adjustable. The plug flow is created by baffles 16, 17, 18, and 19. After traversing baffle 19, the converted reactor feed exits the reactor at outlet 14.

Preferably, the depth of the fluidized reactor bed should not be greater than twice the bed diameter. However, this ratio can change with the pressure of the incoming gases. For instance, as the pressure of the incoming gases increases, it is possible to increase the fluidized bed depth. According to the present invention, it is preferable that the reactor feed has an average diameter of between about 0.1 millimeter and about 1.0 millimeter. Corresponding to this feed size, the preferred fluidized bed depth is about 12 feet (3.66 meters), while the preferred diameter can be up to about 40 feet (12.2 meters), but is preferably not smaller than about 6 feet (1.83 meters). The gas flow is preferably sufficient to maintain a space velocity of between about 1 and about 4 feet per second (0.3 to 1.22 meters per second), more preferably about 2 feet per second (0.61 meters per second). The distance between the baffles is preferably between about 5 and about 10 feet, more preferably between about 6 and about 8 feet.

The progress of the conversion can be thought of as occurring in a number of stages. In the first stage, the conversion of hematite to magnetite is substantially complete. In the remaining stages, the conversion of the magnetite to the iron carbide takes place. It is possible to analyze the set of reaction parameters, as discussed hereinabove, and calculate the degree of conversion in the stages. In this way, it is possible to determine in advance whether the path length obtained through the baffles is sufficient to provide the desired conversion.

An added advantage of the baffled configuration is that in enlarged, non-baffled reactors, such as those over 10 feet in diameter, the use of a single feed and a single discharge point results in an elliptical flow pattern for solids. The elliptical flow pattern results in inactive areas at the sides of the normal flow pattern where the incoming gas is not used for feed conversion. Thus, these inactive areas adversely affect the capacity of the reactor. With the use of baffles, the resulting flow control utilizes the full area of the reactor while requiring only a single feed and a single discharge point. This is important in the iron carbide process, where the ability of incoming gases to contact unreacted feed particles determines the efficiency with which the circulating gas can be utilized.

In a fluidized bed reactor according to the present invention, the conversion gases are preferably heated separately from the fluidized bed reactor. The conversion gases are then transferred to a wind box located below the fluidized bed. The fluidized bed and wind box are separated by an orifice plate to control the pressure drop and assure that the gases are distributed uniformly throughout the fluidized bed.

In order to compensate for the thermal expansion which can take place in the orifice plate so that the plate will remain flat, a novel "S" ring expansion system can be used where the orifice plate is connected to the reactor shell.

Figure 5:
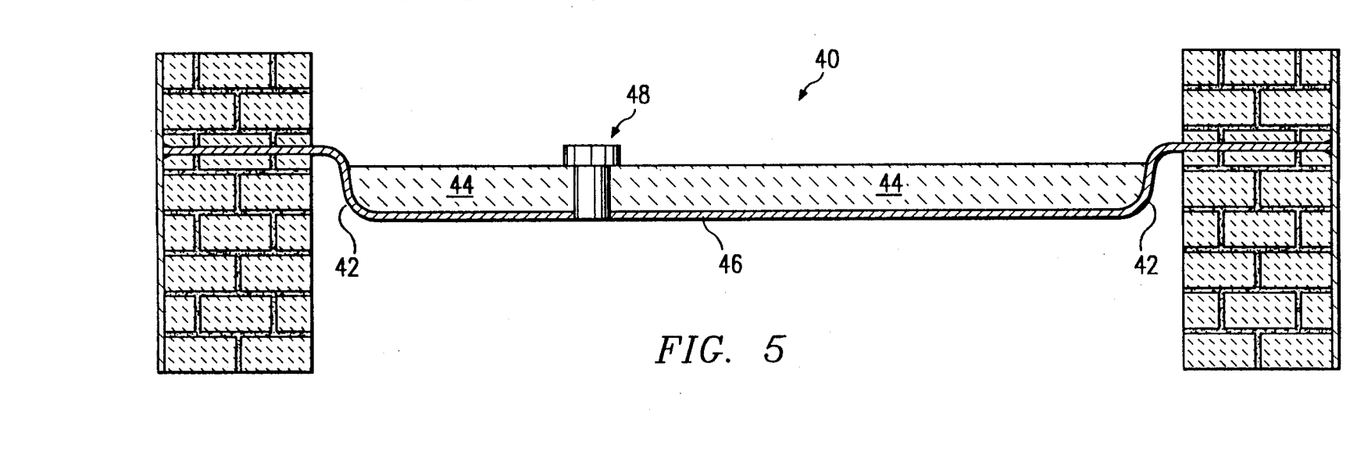
FIG. 5 is a cross-sectional view of an embodiment of an orifice plate design.
Figure 6:
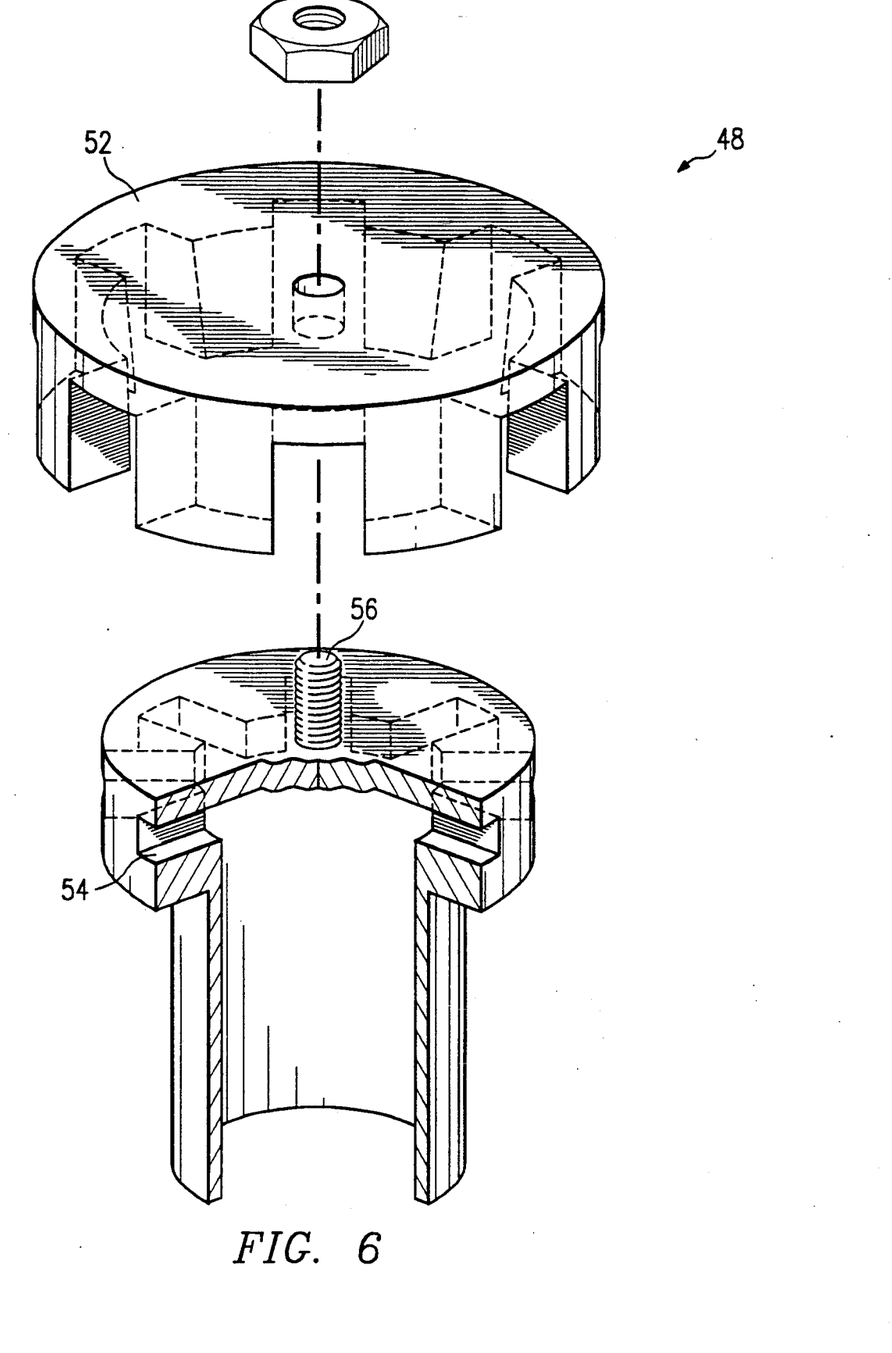
FIG. 6 is an exploded view of an embodiment of an adjustable gas nozzle.

Referring now to FIG. 5, a particular embodiment of such an orifice plate construction is shown. The assembly 40 includes an orifice plate 46 wherein the outer circumference has an "S" type configuration 42. A material may preferably be placed on the orifice plate 44 such as a heat resistant material. Castable refractory material has been found to be particularly useful for this purpose.

One advantage of the orifice plate according to the present invention is that it is possible to place unattached supports (not shown) beneath the orifice plate to minimize sagging. Thus, it is possible to use large diameter orifice plates, and therefore, large diameter fluidized bed reactors, without the problems associated with sagging of the orifice plate.

To accurately control the pressure drop and therefore the distribution of gases moving from the windbox to the fluidized bed, variable orifice nozzles 48 (only one shown), preferably of metallic construction, are utilized. An enlarged view of an orifice nozzle is shown in FIG. 5. The unit consists of a cap 52 which can be rotated about a bolt 56 to change the area of the opening in a base perimeter 54. After the proper opening has been determined and set, the covering cap can be locked in place by means of a set screw (not shown) which, if desired, can be welded in place. This design allows a given reactor to be used to process various sizes of feed materials using different total gas flows, while maintaining constant predetermined pressure drops across the orifice plate.

According to the present invention, the orifice plate preferably comprises between about 2.5 and about 3 nozzles per square foot. Thus, a six foot diameter rector would have approximately 80 nozzles, placed between about 6 and 8 inches apart.

After conversion, the iron components in the ore preferably comprise at least about 90 percent, more preferably at least about 95 percent, more preferably at least about 97 percent, and most preferably at least 98 percent iron carbide. The remaining impurities typically include oxides and metallic iron. Preferably, the maximum iron oxide content is about 2 percent, while the maximum amount of metallic iron is about 1 percent.

The iron carbide produced according to the present invention may have a layer of hydrogen on its surface upon exiting the fluidized bed reactor. Since catalytic combustion of the hydrogen can cause the material to become pyrophoric, it is desirable to treat the iron carbide to remove the hydrogen layer. For instance, the iron carbide may be subjected to a flow of inert gas, for example, nitrogen, carbon dioxide or noble gas, to remove the hydrogen. The flow rate and quantity of gas should be sufficient to remove most of the hydrogen. Alternatively, the hydrogen may be removed by placing the iron carbide in a vacuum.

According to one embodiment of the present invention, the iron carbide can be utilized in a direct steel-making process. Preferably, the conversion of the iron carbide to steel occurs in a basic oxygen furnace. Because of the nature of the basic oxygen furnace process, special conditions apply to the processing of iron carbide to steel by this process as compared to other steel-making processes and furnaces.

If the conversion step and the steel-making step are close-coupled, heat calculations show that only a small amount of added heat is required to make the process auto-thermal. Preferably, the iron carbide comes out of the fluidized bed unit at an elevated temperature of about 480° C. to about 710° C., more preferably from about 550° C. to about 600° C., and is added directly to the basic oxygen furnace at that temperature. Alternatively, the iron carbide can be heated to 1200° C. to provide substantially all of the heat to make the process auto-thermal.

In one configuration, the off-gases from the steel-making furnace are channelled directly to the fluidized bed unit. In this embodiment of the process, substantially all of the carbon used in the fluidized bed unit to convert the oxides to iron carbide is recovered as carbon monoxide in the furnace and recycled through the fluidized bed unit to be reused in producing iron carbide.

If the iron carbide product is cooled before the steel-making step, then heat must be added either in the form of reheating the iron carbide product or adding extra heat to the steel-making step.

Heat balance calculations show that at ambient temperature, iron carbide does not contain fuel value sufficient to permit the reaction taking place in the basic oxygen furnace to be auto-thermal. The additional heat required to make the reaction self-sustaining can be supplied in a number of ways. For example, the off-gas from the basic oxygen furnace produced by the processing of iron carbide contains about 90 percent carbon monoxide in addition to substantial, sensible heat. The sensible heat may be exploited through the use of heat exchangers or otherwise to heat the incoming iron carbide. By burning a portion of the off-gas, sufficient heat can be generated to augment the sensible heat and to affect the required preheating of the incoming iron carbide charge to make the process auto-thermal. Under some conditions, the sensible heat alone is sufficient or the heat for the preheating can be obtained entirely from combustion of the off-gas. Preferably, the preheat temperature range is from about 700° C. to about 1200° C., more preferably from about 1100° C. to about 1200° C.

As another alternative, the heat required to make the process auto-thermal can be supplied wholly or in part by direct heating of the $Fe_3C$ charge with an external heat source. Sufficient carbon may also be added to the iron carbide to provide any required additional heat by combustion during the process. The amount of carbon added varies from about 3 weight percent to about 5 weight percent of the iron carbide. The carbon may be added directly to the iron carbide by preheating the iron carbide in carbon-bearing gases consisting primarily of carbon monoxide. Alternatively, hot metal may be added to the oxygen furnace charge to provide additional heat.

In conventional basic oxygen steel-making, scrap iron is typically added to molten pig iron (hot metal) for cooling purposes. In accordance with the present invention, instead of scrap iron, cold iron carbide charge can be added to molten pig iron in the basic oxygen or electric furnace. A significant advantage of this feature is that iron carbide can be added as a coolant in an amount two times the amount of scrap iron that can be added to conventional basic oxygen furnace processes for cooling. For example, iron carbide can be added in an amount up to 50 percent by weight of the iron carbide-hot metal charge. On the other hand, the standard basic oxygen furnace procedure calls for adding about 70 percent hot metal and about 30 percent scrap iron. Using iron carbide, less hot metal is added to the charge, therefore, a plant that uses scrap iron as a coolant can make 50 percent more steel by using iron carbide. One advantage of this is that blast furnaces which may presently be in place can continue to be operated in conjunction with the present process.

If the steel-making is conducted in an electric furnace, any extra heat required may be supplied by means of the electrical energy normally used in this type of furnace.

The steel-making process includes the above procedures, alone or in combination, for providing the necessary heat for the iron carbide charge to make the reaction in the basic oxygen furnace auto-thermal, if desired.

A number of advantages of the above-described process are apparent from the above description. One advantage is that it eliminates the expensive, intermediate blast furnace step in converting iron ore to steel. When the converting and steel-making steps are performed in combination at the same site, only a small amount of added heat is necessary for the steel-making step and carbon monoxide from the steel-making step provides the necessary carbon for conversion of iron ore. When molten pig iron (hot metal) is used in steel-making, large amounts of iron carbide can be added for cooling. The overall process is practically pollution-free and provides for maximum conservation and reuse of non-product reactants. A further advantage of the overall process is that it results in a savings in transportation costs when the carbide is made near the mine before transport to the steel-making furnace since iron carbide contains a higher percentage of usable material than iron oxide.

EXAMPLES

EXAMPLE 1

To observe the effect of preheat temperature and time on the oxidation of iron ore, particularly the conversion of magnetite to hematite, a Luossavaara-Kiirunavaara AB magnetite concentrate ore was obtained. The ore had a nominal composition of 96.0 percent $Fe_3O_4$ and 2.5 percent $Fe_2O_3$, as determined by Mossbauer analysis.

The ore was preheated in an oxidizing atmosphere at either 550° C. or 800° C. for varying time periods. The results are summarized in Table 1.

TABLE 1

| Temp. (°C.) | Time (Hrs.) | $Fe_3O_4$ (%) | $Fe_2O_3$ (%) |
|---|---|---|---|
| 550 | 16 | 54.2 | 44.3 |
| 550 | 24 | 52.5 | 46.0 |
| 550 | 36 | 40.7 | 57.8 |
| 550 | 48 | 39.6 | 58.8 |
| 550 | 96 | 37.0 | 61.5 |
| 800 | 3 | 42.2 | 56.3 |
| 800 | 4 | 20.8 | 77.7 |
| 800 | 8 | 19.0 | 79.5 |
| 800 | 16 | 11.0 | 87.5 |

As is apparent from Table 1, the ore was most effectively oxidized at 800° C. for extended periods of time, such as 16 hours. Only partial oxidation was realized at a temperature of 550° C.

EXAMPLE 2

The iron ore concentrate from Example 1 and a high hematite content on the conversion of iron ore to iron carbide. The results of this testing are shown in Table 2. Samples 1 and 4 were not preheated in an oxidizing atmosphere. Sample 2 was oxidized at 550° C. for twenty-four hours and Sample 3 was oxidized at 800° C. for sixteen hours. All four samples were reduced and carburized in a fluidized bed reactor for six hours at 650° C., except Sample 4 which was reduced and carburized at 550° C. for 6 hours. These results are summarized in Table 2 below.

TABLE 2

| | Prior to Preheat | | After Preheat | |
|---|---|---|---|---|
| Sample | $Fe_3O_4$ (%) | $Fe_2O_3$ (%) | $Fe_3O_4$ (%) | $Fe_2O_3$ (%) |
| 1 | 96.0 | 2.5 | — | — |
| 2 | 96.0 | 2.5 | 52.5 | 46.0 |
| 3 | 96.0 | 2.5 | 11.0 | 87.5 |
| 4 | 3.0 | 92.5 | — | — |

| | After Reduction | | | |
|---|---|---|---|---|
| | $Fe_3O_4$ | $Fe_2O_3$ | Fe | $Fe_3C$ |
| Sample | (%) | (%) | (%) | (%) |
| 1 | 0 | 3.4 | 39.2 | 55.9 |
| 2 | 2.0 | 0 | 25.8 | 70.7 |
| 3 | 4.3 | 0 | 10.6 | 83.6 |
| 4 | 5.0 | 0 | 0.7 | 89.8 |

The conversion of iron ore to iron carbide was most significant when the iron ore contained mostly hematite or was converted primarily to hematite prior to reduction and carburization.

EXAMPLE 3

Conversion tests were run on oxidized and non-oxidized rod-mill discharge ores and the resulting compositions were analyzed, including sulfur content. The results are shown in Table 3.

TABLE 3

| Sample/Time | $Fe_3C$ (%) | $Fe_3O_4$ (%) | $Fe_2O_3$ (%) | Met. Fe (%) | S (%) |
|---|---|---|---|---|---|
| Rod Mill Discharge Product (Unoxidized) | | | | | |
| 0 hours | 0.0 | 89.1 | 10.9 | 0.0 | 0.40 |
| 2 hours | 1.6 | 65.8 | 0.0 | 32.6 | 0.40 |
| 4 hours | 1.9 | 39.5 | 0.0 | 58.6 | 0.39 |
| 6 hours | 7.4 | 25.2 | 0.0 | 67.4 | 0.39 |
| Rod Mill Discharge Product (Oxidized) | | | | | |
| 0 hours | 0.0 | 59.9 | 40.1 | 0.0 | 0.14 |
| 2 hours | 70.7 | 6.7 | 0.0 | 22.6 | 0.14 |
| 4 hours | 91.5 | 5.7 | 0.0 | 2.8 | 0.13 |
| 6 hours | 92.2 | 4.7 | 0.0 | 2.1 | 0.13 |

Figure 7:
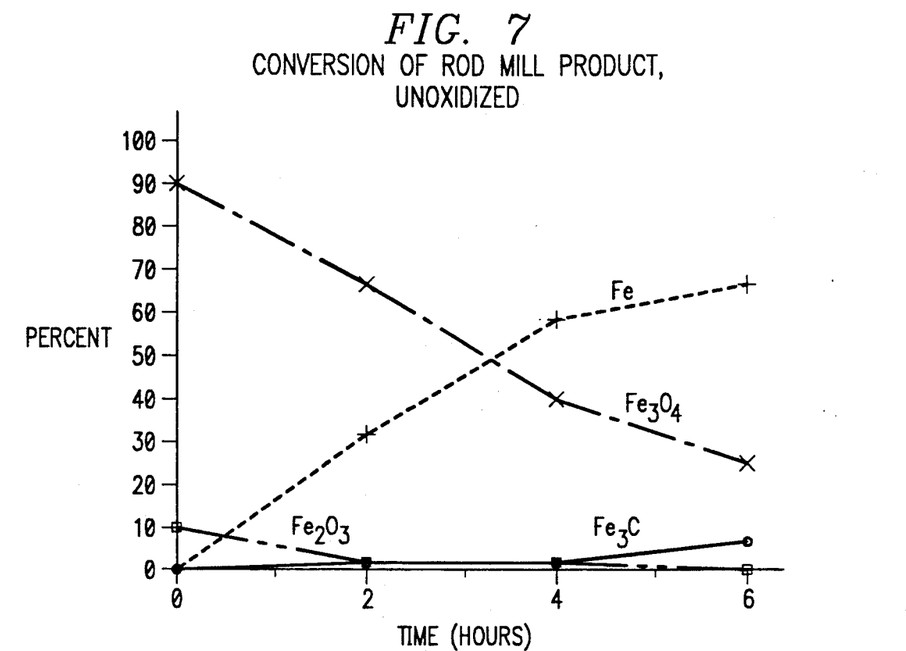
FIG. 7 is a graphical representation of the compositional changes during the conversion of a non-oxidized ore containing sulfide sulfur.
Figure 8:
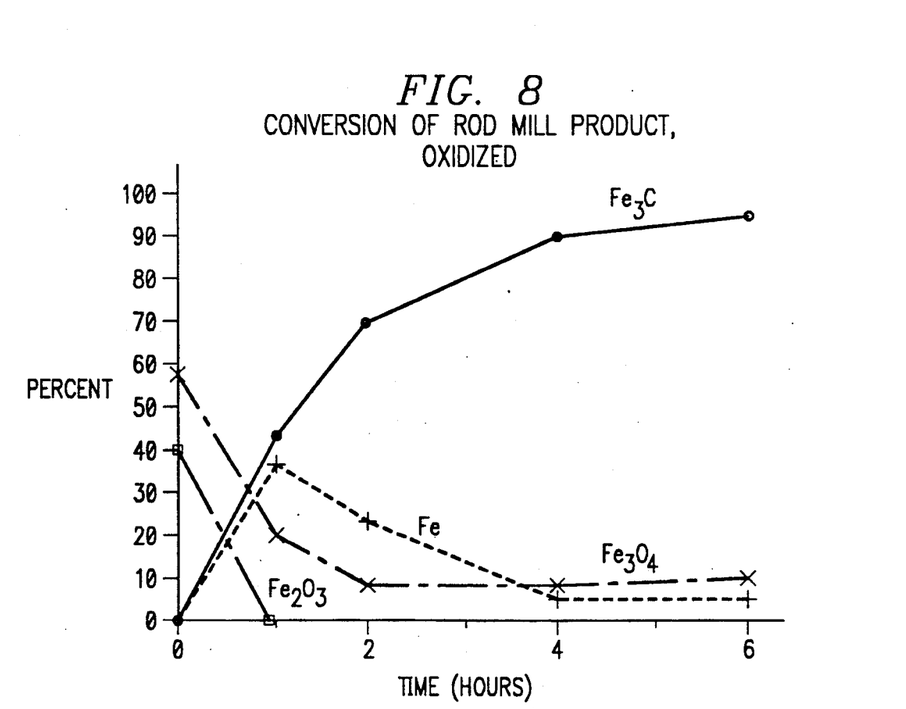
FIG. 8 is a graphical representation of the compositional changes during the conversion of a partially oxidized ore containing sulfate sulfur.

The rod mill discharge that was oxidized contained significantly less sulfide sulfur, and resulted in the of about 92 percent $Fe_3C$. The compositional phases present during the carburization and reduction are shown graphically in FIGS. 7 and 8. This example demonstrates the advantages of removing sulfide sulfur from the reactor feed.

EXAMPLE 4

Table 4 shows the equilibrium gas compositions for the $Fe-Fe_3C-Fe_3O_4$ or FeO triple point at various temperatures. The information was calculated from stability diagrams, such as that shown in FIG. 1. In FIG. 1, the triple point is shown at "X". This table is useful for illustrating the effect of incoming water on the conversion to iron carbide. The table shows the maximum water content that can be tolerated in the reactor off gas. For example, with a reactor operating at 1.5 atmospheres and 600° C., 14.08 percent of water by volume is the maximum that can occur in the off gas. If the recycled gas contains 1.5 percent water, the reaction can produce 12.58 percent water per pass if no water is present in the solid feed. If the feed were to contain the equivalent of an additional 1 percent water as free or combined moisture, this would have the effect of decreasing the ability of the reactor to produce iron carbide by approximately 8 percent (1/12.58), a serious reduction. Thus, removal of the water in the preheat step materially improves the production rate of the system.

TABLE 4

| Total Pressure | % | \multicolumn{5}{c}{Temperature, Deg. F. (Deg. C.)} | | | | |
|---|---|---|---|---|---|---|
| | | 842 (450) | 932 (500) | 1022 (550) | 1112 (660) | 1202 (650) |
| 1 atm | $N_2$ | 4 | 4 | 4 | 4 | 4 |
| | CO | 0.26 | 1.24 | 4.87 | 14.63 | 36.97 |
| | $CO_2$ | 0.26 | 1.24 | 4.87 | 13.12 | 28.51 |
| | $H_2$ | 17.81 | 29.23 | 39.45 | 40.36 | 20.97 |
| | $H_2O$ | 2.57 | 6.07 | 11.30 | 13.76 | 7.92 |
| | $CH_4$ | 75.08 | 58.19 | 35.50 | 14.10 | 1.60 |
| 1.5 atm | $N_2$ | 4 | 4 | 4 | 4 | 4 |
| | CO | 0.17 | 0.82 | 3.24 | 9.75 | 24.65 |
| | $CO_2$ | 0.17 | 0.82 | 3.24 | 8.74 | 19.00 |
| | $H_2$ | 14.88 | 25.04 | 35.69 | 41.28 | 33.52 |
| | $H_2O$ | 2.14 | 5.20 | 10.22 | 14.08 | 12.66 |
| | $CH_4$ | 78.61 | 64.08 | 43.58 | 22.13 | 6.15 |
| 1.8 atm | $N_2$ | 4 | 4 | 4 | 4 | 4 |
| | CO | 0.14 | 0.69 | 2.70 | 8.13 | 20.54 |
| | $CO_2$ | 0.14 | 0.69 | 2.70 | 7.29 | 15.84 |
| | $H_2$ | 13.71 | 23.29 | 33.85 | 40.76 | 36.81 |
| | $H_2O$ | 1.97 | 4.84 | 9.69 | 13.90 | 13.90 |
| | $CH_4$ | 80.01 | 66.48 | 47.03 | 25.90 | 8.90 |
| 2 atm | $N_2$ | 4 | 4 | 4 | 4 | 4 |
| | CO | 0.13 | 0.62 | 2.43 | 7.31 | 18.48 |
| | $CO_2$ | 0.13 | 0.62 | 2.43 | 6.56 | 14.25 |
| | $H_2$ | 13.06 | 22.31 | 32.77 | 40.28 | 38.18 |
| | $H_2O$ | 1.88 | 4.63 | 9.38 | 13.74 | 14.42 |
| | $CH_4$ | 80.78 | 67.80 | 48.97 | 28.09 | 10.64 |

While various embodiments of the present invention have been described in detail, it is apparent that modifications and adaptations of those embodiments will occur to those skilled in the art. However, it is to be expressly understood that such modifications and adaptations are within the spirit and scope of the present invention, as set forth in the following claims

What is claimed is:

1. A process for the conversion of a reactor feed to iron carbide, comprising the steps of:
    a) preheating at least a portion of the reactor feed in an oxidizing atmosphere to oxidize at least a portion of said reactor feed; and
    b) converting at least a portion of the preheated reactor feed to iron carbide.

2. A process as recited in claim 1, wherein said preheating step comprises heating the reactor feed to a temperature of between about 500° C. and about 900° C.

3. A process as recited in claim 1, wherein the reactor feed is preheated for a time period from about 2 hours to about 5 hours.

4. A process as recited in claim 1, wherein the preheated reactor feed comprises at least about 30 weight percent hematite.

5. A process as recited in claim 1, wherein at least about 90 weight percent of the iron in the preheated reactor feed is converted to iron carbide.

6. A process as recited in claim 1, wherein said converting step comprises placing the preheated reactor feed in a fluidized bed reactor and contacting the reactor feed with reducing and carburizing gases to convert at least a portion of the reactor feed to iron carbide.

7. A process as recited in claim 6, wherein said gases comprise hydrogen, carbon monxide, carbon dioxide, methane and water.

8. A process as recited in claim 6, wherein said fluidized bed reactor comprises a plurality of baffles to define a flow path.

9. A process as recited in claim 1, further comprising the step of rinsing the iron carbide in an inert gas to remove hydrogen from the surface thereof.

10. A process as recited in claim 9, wherein said gas is selected from the group consisting of nitrogen and carbon dioxide and noble gases.

11. A process as recited in claim 1, further comprising the step of placing the iron carbide in a vacuum to remove hydrogen from the surface thereof.

12. A process for the conversion of reactor feed which contains sulfide sulfur to iron carbide, comprising the steps of:
    a) preheating the reactor feed to volatilize at least a portion of said sulfide sulfur; and
    b) converting at least a portion of the preheated reactor feed to iron carbide.

13. A process as recited in claim 12, wherein said preheating step comprises heating the reactor feed to a temperature of between about 500° C. and about 900° C.

14. A process as recited in claim 12, wherein the preheated reactor feed comprises less than about 0.2 weight percent sulfur.

15. A process for the conversion of reactor feed to iron carbide, comprising the steps of:
    a) preheating the reactor feed to volatilize at least a portion of water present in the reactor feed and oxidize at least a portion of the reactor feed; and
    b) converting at least a portion of the preheated reactor feed to iron carbide.

16. A process as recited in claim 15, wherein said preheating step comprises heating the reactor feed to a temperature of between about 500° C. and about 800° C.

17. A process as recited in claim 15, wherein the preheated reactor feed comprises less than about 3 percent water.

18. A process for the conversion of reactor feed comprising magnetite to iron carbide, comprising the steps of:
    a) preheating the reactor feed in an oxidizing atmosphere to a temperature of at least about 500° C. to convert at least a portion of the magnetite to hematite; and
    b) converting at least about 90 weight percent of the iron in the reactor feed to iron carbide in a fluidized bed reactor.

19. A process for the production of steel from a reactor feed, comprising the steps of:
    a) preheating the reactor feed in an oxidizing atmosphere to a temperature to at least 500° C.;
    b) converting the preheated reactor feed in a fluidized bed reactor to convert at least a portion of the iron in the reactor feed to iron carbide;
    c) using the iron carbide to make steel in a steel-making furnace.

20. A process as recited in claim 19, wherein the steel is made by oxidizing a portion of the carbon in the iron carbide to carbon monoxide with the heat released thereby providing heat for operation of the steel-making furnace.

21. A process as recited in claim 20, wherein the iron carbide is at a temperature in the range from about 480° C. to about 710° C. upon exiting the fluidized bed reactor.

22. A process as recited in claim 19, wherein said carburizing step includes contacting the reactor feed with an equilibrium gas composition comprising carbon monoxide, carbon dioxide, hydrogen, water, and methane.

23. A process as recited in claim 19, further comprising the step of rinsing the iron carbide with a gas following said converting step to remove hydrogen from the surface thereof.

24. A process as recited in claim 22, wherein said gas is selected from the group consisting of nitrogen, carbon dioxide and noble gases.

25. A process as recited in claim 19, further comprising the step of placing the iron carbide in a vacuum to remove hydrogen from the surface thereof.

* * * * *